(12) United States Patent
Mish et al.

(10) Patent No.: US 7,703,376 B2
(45) Date of Patent: Apr. 27, 2010

(54) HYDRAULIC APPARATUS RETURN TO NEUTRAL MECHANISM

(75) Inventors: Dean Mish, Potosi, WI (US); Jamie Coates, Dubuque, IA (US); Kristy Konrardy, Peosta, IA (US); Wayne R. Sinks, Greeneville, TN (US); Billie F. Burleigh, Birmingham, AL (US); Brook Cutshaw, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 220 days.

(21) Appl. No.: 11/935,464

(22) Filed: Nov. 6, 2007

(65) Prior Publication Data

US 2008/0245066 A1 Oct. 9, 2008

Related U.S. Application Data

(60) Provisional application No. 60/921,567, filed on Apr. 3, 2007.

(51) Int. Cl.
*F01B 3/02* (2006.01)
(52) U.S. Cl. .................................................. 92/12.2
(58) Field of Classification Search ............ 92/12.2; 91/504–506
See application file for complete search history.

(56) References Cited

U.S. PATENT DOCUMENTS

| | | | |
|---|---|---|---|
| 2,957,421 A | 10/1960 | Mock | |
| 3,186,310 A | 6/1965 | Neff et al. | |
| 3,256,830 A | 6/1966 | Budzich | |
| 3,327,475 A | 6/1967 | Clark et al. | |
| 3,384,027 A | 5/1968 | Jennings et al. | |
| 3,416,452 A | 12/1968 | Misulis | |
| 3,431,857 A | 3/1969 | Jennings et al. | |
| 3,784,327 A | 1/1974 | Lonnemo | |
| 3,784,328 A | 1/1974 | Pedersen | |
| 3,837,235 A * | 9/1974 | Peterson | 74/531 |
| 4,283,962 A * | 8/1981 | Forster | 91/506 |
| 5,207,144 A * | 5/1993 | Sporrer et al. | 92/12.2 |
| 5,836,159 A | 11/1998 | Shimizu et al. | |
| 6,119,456 A | 9/2000 | Louis et al. | |
| 6,413,055 B1 | 7/2002 | Geringer et al. | |
| 6,487,857 B1 | 12/2002 | Poplawski et al. | |
| 6,701,825 B1 | 3/2004 | Langenfeld | |
| 6,715,284 B1 | 4/2004 | Poplawski et al. | |
| 6,766,715 B1 | 7/2004 | Wiley et al. | |
| 6,782,797 B1 | 8/2004 | Brandenburg et al. | |
| 6,880,333 B1 | 4/2005 | Taylor et al. | |
| 6,915,872 B2 | 7/2005 | Wiley et al. | |
| 6,964,164 B1 | 11/2005 | Langenfeld | |
| 6,968,687 B1 | 11/2005 | Poplawski et al. | |
| 7,000,723 B1 | 2/2006 | Wiley et al. | |
| 7,111,545 B1 | 9/2006 | Langenfeld et al. | |

(Continued)

FOREIGN PATENT DOCUMENTS

JP 2146269 5/1990

*Primary Examiner*—F. Daniel Lopez
(74) *Attorney, Agent, or Firm*—Robert J. Clark (57) ABSTRACT

A return to neutral mechanism to bias the trunnion of a hydraulic apparatus into the neutral position is provided. The trunnion is rotationally coupled to a bracket which is coupled to a glide member that is positioned between, and biased to a predetermined position by, a pair of compression springs.

13 Claims, 6 Drawing Sheets

U.S. PATENT DOCUMENTS 7,131,267 B1 11/2006 Keller et al.
7,197,873 B1 4/2007 Windhorst et al.
2005/0053478 A1 3/2005 Sakikawa et al.
2006/0120885 A1 6/2006 Sakikawa et al.
2006/0269421 A1 11/2006 Sakikawa et al.

* cited by examiner

HYDRAULIC APPARATUS RETURN TO NEUTRAL MECHANISM

CROSS REFERENCE TO RELATED APPLICATIONS

The present application claims the benefit of the filing date of U.S. Provisional Patent Application Ser. No. 60/921,567, filed Apr. 3, 2007, the disclosure of which is incorporated herein by reference.

FIELD OF THE INVENTION

The invention herein described relates generally to a hydraulic apparatus with return to neutral mechanism.

BACKGROUND

Many hydraulic apparatuses, such as pumps or motors, include a device that is rotatable for varying the displacement of the apparatus. For example, on a hydraulic pump, such as an axial piston pump, a swash plate is connected to a trunnion arm that is rotatable for varying the displacement of the pump. More specifically, rotation of the trunnion arm rotates the swash plate to vary the displacement of a pumping unit of the hydraulic pump. When the swash plate is in a predetermined location, there is no displacement from the hydraulic pump. The position of the trunnion arm associated with this predetermined location of the swash plate is commonly referred to as the neutral position. Thus, when the trunnion arm is in the neutral position, there is no fluid displacement from the hydraulic pump. When the trunnion arm is rotated in a first direction from the neutral position, the swash plate rotates away from the predetermined location in a first direction and hydraulic fluid flows out of a first system port of the pump. Similarly, when the trunnion arm is rotated in a second direction, opposite the first direction, the swash plate is rotated away from the predetermined location in a second direction, opposite the first direction, and hydraulic fluid flows out of a second system port of the pump.

Mechanisms are associated with such hydraulic apparatuses for acting upon the trunnion to bias the trunnion into the neutral position. One such mechanism is shown in U.S. Pat. No. 6,968,687, hereby incorporated by reference.

SUMMARY

At least one embodiment of the invention provides a hydraulic apparatus comprising: a housing; a trunnion arm extending from the housing; a bracket rotationally coupled to the trunnion arm; a first biasing member biasing the bracket toward a neutral position when the bracket is rotated in a first direction; and a second biasing member biasing the bracket toward the neutral position when the bracket is rotated in a second direction; the first biasing member and the second biasing member are generally colinear.

At least one embodiment of the invention provides a hydraulic apparatus comprising: a housing; a trunnion arm extending from the housing; a first bracket rotationally coupled to the trunnion arm; a second bracket fixed to the housing; a rod member pivotally connected to the second bracket; a glide member pivotally coupled to the first bracket and translatable along the rod member; a first biasing member biasing the glide member to move the first bracket toward a neutral position when the first bracket is rotated in a first direction; and a second biasing member biasing the glide member to move the first bracket toward the neutral position when the first bracket is rotated in a second direction.

At least one embodiment of the invention provides a hydraulic apparatus comprising: a housing; a trunnion arm extending from the housing; a first bracket rotationally coupled to the trunnion arm; and a return to neutral assembly comprising: a second bracket fixed to the housing; a rod member pivotally connected to the second bracket; a glide member pivotally coupled to the first bracket and translatable along the rod member; and at least one compression spring positioned on the rod member, the spring capable of biasing the guide member to move the bracket toward a neutral position when the bracket is rotated in a first direction.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
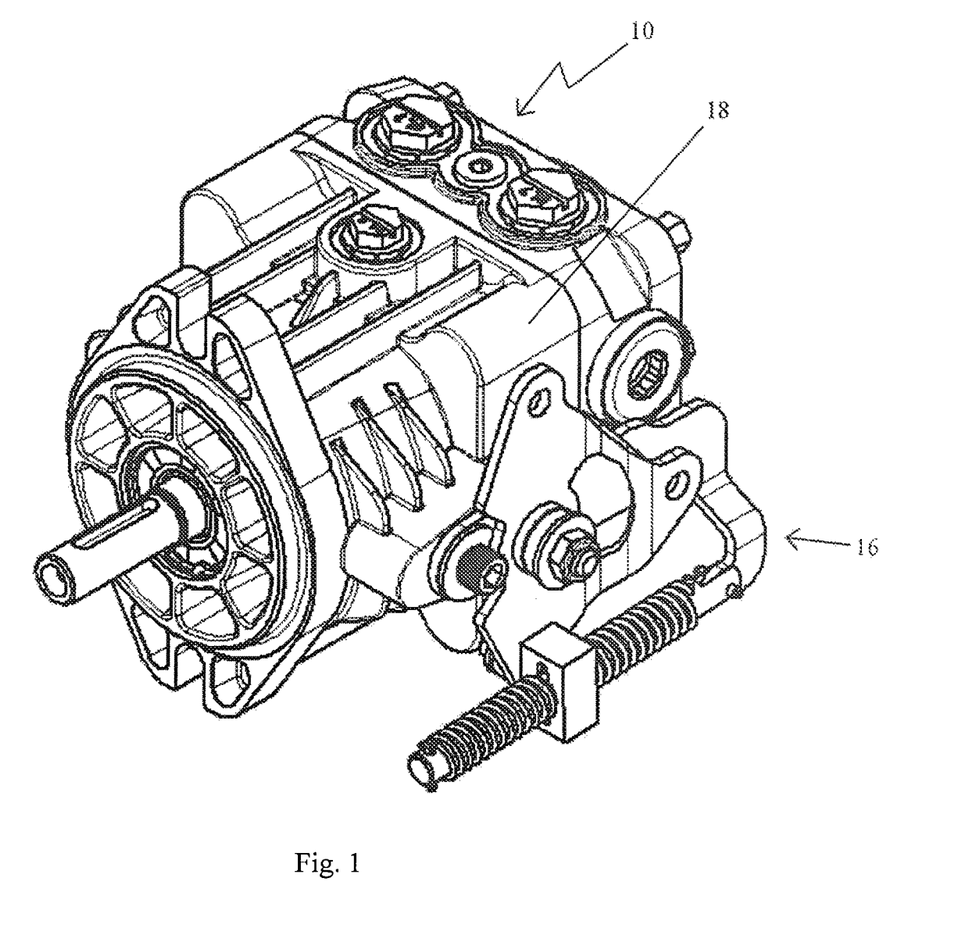
FIG. 1 is a perspective view a hydraulic apparatus having a return to neutral mechanism in accordance with an embodiment of the present invention.

The present invention is directed toward a hydraulic apparatus with a return to neutral mechanism. FIG. 1 illustrates an exemplary hydraulic apparatus. The hydraulic apparatus of FIG. 1 is an axial piston pump 10. The axial piston pump 10 includes a rotating group (not shown) and an associated swash plate (not shown). A trunnion arm 14 is associated with the swash plate and controls rotation to the swash plate.

Figure 2:
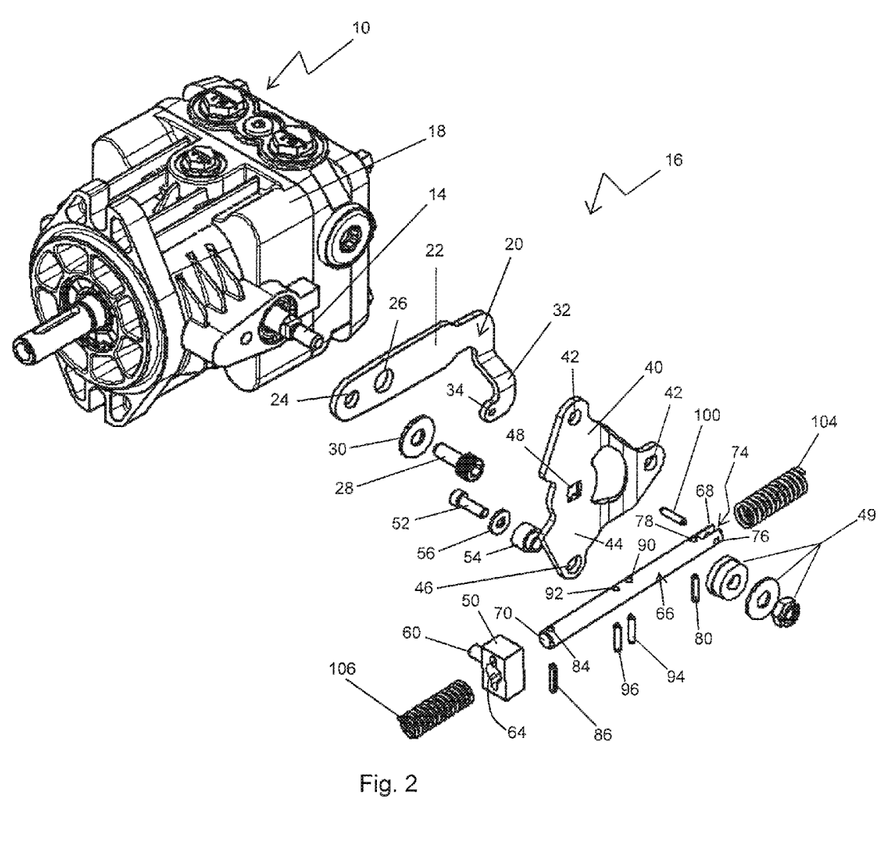
FIG. 2 is an exploded view of the return to neutral mechanism shown in FIG. 1 adjacent a perspective view of the hydraulic apparatus of FIG. 1.

FIG. 1 also illustrates a return to neutral mechanism 16. An exploded view of the return to neutral mechanism 16 is shown in FIG. 2. The return to neutral mechanism 16 is attachable to a housing 18 of the pump 10 and acts to bias the trunnion arm 14 into a neutral position in which displacement of the pump is zero.

As best shown in FIG. 2, the return to neutral mechanism 16 includes a stationary bracket 20 that is fixed to housing 18. The stationary bracket 20 includes a longitudinal portion 22 that includes first and second through holes 24 and 26. Through hole 24 is configured for receiving a bolt 28 or other fastener for fixing the stationary bracket 20 to the housing 18. A washer 30 may be used along with the bolt 28. Through hole 26 is sized for receiving the trunnion arm 14 in a slip fit manner such that the trunnion arm may rotate relative to the stationary bracket 20. The trunnion arm 14, along with the bolt 28, helps to maintain the position of the stationary bracket 20 relative to the housing 18. The stationary bracket 20 also includes a bent arm portion 32 that extends from an end of the stationary bracket 20 opposite through hole 24.

FIG. 2 illustrates a through hole 34 extending through an end of the bent arm on a side opposite the longitudinal portion 22.

The return to neutral mechanism 16 also includes a rotating bracket 40. The rotating bracket 40 includes provisions 42 for attachment to a linkage (not shown) for rotating the trunnion arm 14. The rotating bracket 40 also includes an attachment portion 44. A through hole 46 extends through the attachment portion 44. A center opening 48 extends through the rotating bracket for attachment of the rotating bracket 40 to the trunnion arm 14. The trunnion arm 14 is form fit through the center hole 48 and is fixed in place by fastener means 49. The rotating bracket 40 is configured to enable mounting on the housing 18 in two rotational orientations, 180 degrees apart.

A guide block 50 of the return to neutral mechanism 16 is pivotally attached to the attachment portion 44 of the rotating bracket 40. In the embodiment illustrated, the guide block 50 is attached to the attachment portion 44 by a bolt 52 extending through a bushing 54 that is received in the through hole 46. A rod 60 extending from a surface of the guide block 50 extends into the bushing, receives the bolt 52, and is rotatable within the bushing. A washer 56 is associated with the bolt 52 to limit movement of the rod 60 in the bushing 54. The guide block 50 also includes a double slotted through hole 64 that extends through the guide block 50 in a direction perpendicular to the rod 60.

The return to neutral mechanism 16 also includes a spring rod 66. The spring rod 66 is an axially extending rod having opposite first and second ends 68 and 70. A slot 74 extends into the first end 68 of the spring rod 66. A through hole 76 extends through the first end 68 of the spring rod 66 and intersects the slot 74. A through hole 78 for receiving a pin 80 extends through the spring rod 66 immediately adjacent to the slot 74. A through hole 84 for receiving a pin 86 extends through the spring rod 66 near the second end 70. First and second through holes 90 and 92, for receiving pins 94 and 96, respectively, extend through a center of the spring rod 66. When received in the through holes 90 and 92, pins 94 and 96 are oriented in a direction for alignment with the double slots of the double slotted through hole 64 in the guide block 50.

The spring rod 66 is pivotally attached to the bent arm 32 of the stationary bracket 20 using a pivot pin 100 that extends through holes 34 and 76. When attached to the spring rod 66, a portion of the bent arm 32 extends into the slot 74, as shown in FIG. 1.

The return to neutral mechanism 16 also includes at least one spring. The embodiment illustrated in FIGS. 1 and 2 includes two springs 104 and 106. Springs 104 and 106 are helically wound compression springs. The springs 104 and 106 may have the same spring constant or a different spring constant depending upon the desired bias toward the neutral position. Spring 104 receives the spring rod 66 and is interposed between pins 80 and 94. Spring 106 receives the spring rod 66 and is interposed between pins 86 and 96.

Figure 3:
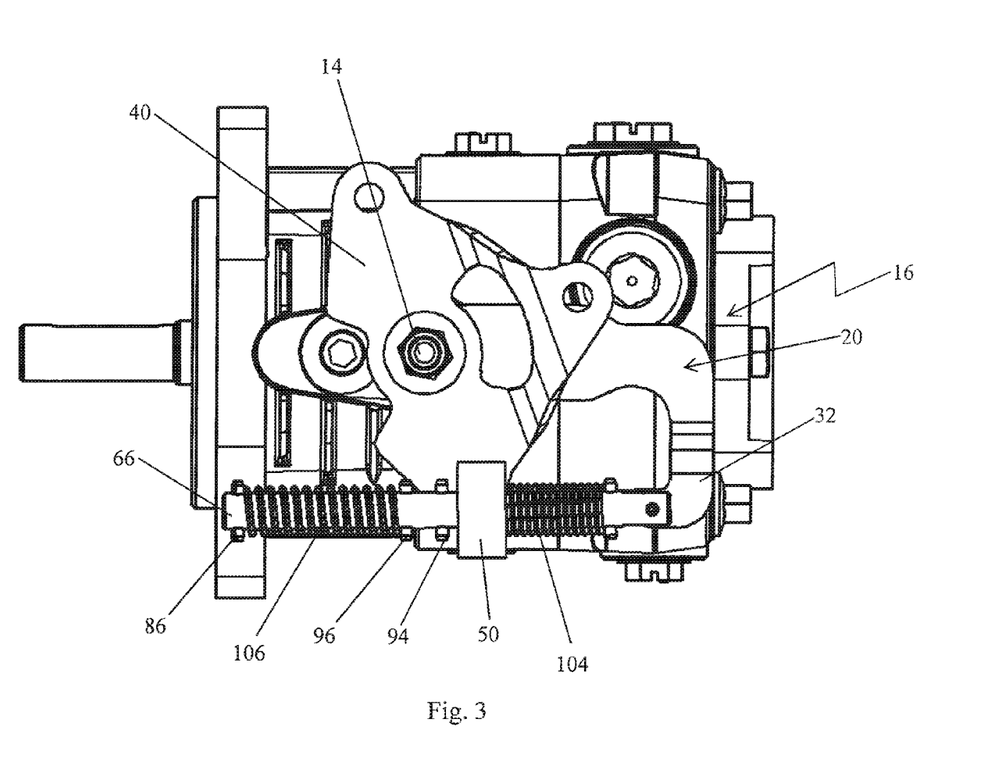
FIG. 3 is elevational side view of the hydraulic apparatus having a return to neutral mechanism shown in FIG. 1 having a first compression spring in a compressed state.

During operation of the pump, an input effort is received on the rotating bracket 40 to rotate the rotating bracket and thus, the trunnion arm 14 away from the neutral position. Rotation of the rotating bracket 40 moves the guide block 50 along the spring rod 66 compressing one of springs 104 or 106, depending upon the direction of rotation of the rotating bracket 40. FIG. 3 illustrates the return to neutral mechanism 16 with the rotating bracket 40 rotated in a counterclockwise direction. Upon counterclockwise rotation, guide block 50 moves toward the bent arm 32 of the stationary bracket 20 and compresses spring 104. During this movement, spring 106 remains held in place by pins 86 and 96. When an input effort is removed from rotating bracket 40, spring 104 acts to move the guide block 50 to a position in which pins 94 and 96 are located tangent to opposite sides of the guide block. This movement of guide block 50 rotates the trunnion arm 14 back to the neutral position. During movement of the guide block 50 relative to the spring rod 66, the guide block 50 rotates relative to the rotating bracket 40 and the spring rod 66 rotates relative to the stationary bracket 20 to enable linear movement of the spring rod through the double slotted through hole of the guide block.

Figure 4:
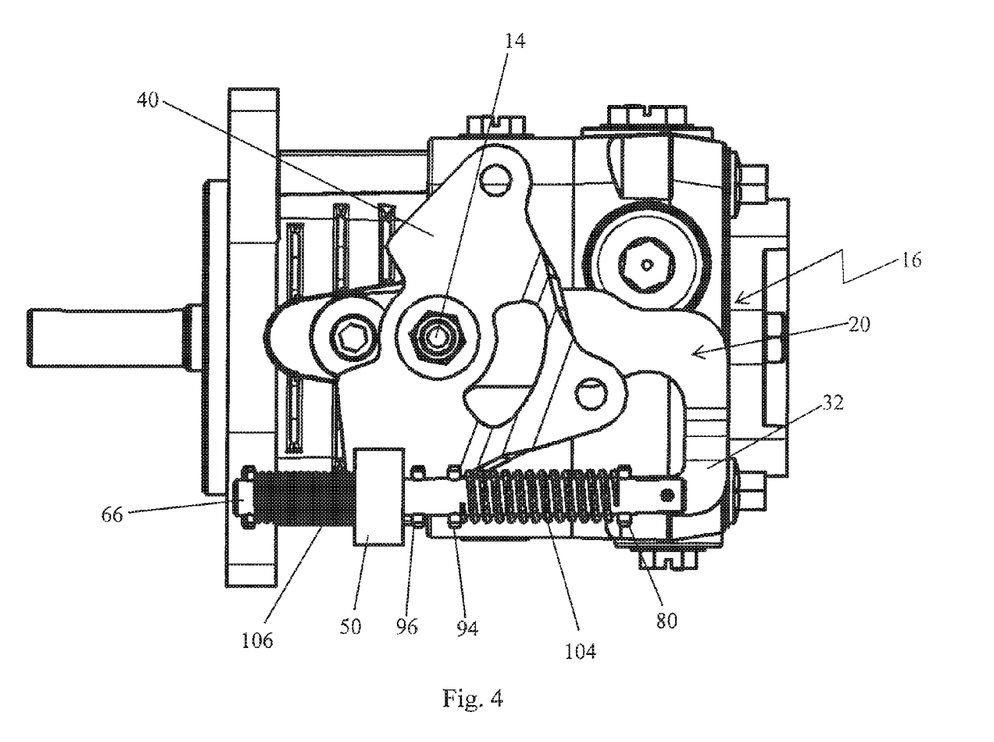
FIG. 4 is elevational side view of the hydraulic apparatus having a return to neutral mechanism shown in FIG. 1 having a second compression spring in a compressed state.

FIG. 4 illustrates the return to neutral mechanism 16 with the rotating bracket 40 rotated in a clockwise direction. Upon clockwise rotation, guide block 50 moves away from the bent arm 32 of the stationary bracket 20 and compresses spring 106. During this movement, spring 104 remains held in place by pins 80 and 94. When an input effort is removed from rotating bracket 40, spring 106 acts to move the guide block 50 to a position in which pins 94 and 96 are located tangent to opposite sides of the guide block. This movement of guide block 50 rotates the trunnion arm 14 back to the neutral position. During movement of the guide block 50 relative to the spring rod 66, the guide block 50 rotates relative to the rotating bracket 40 and the spring rod 66 rotates relative to the stationary bracket 20 to enable linear movement of the spring rod through the double slotted through hole of the guide block.

Figure 5:
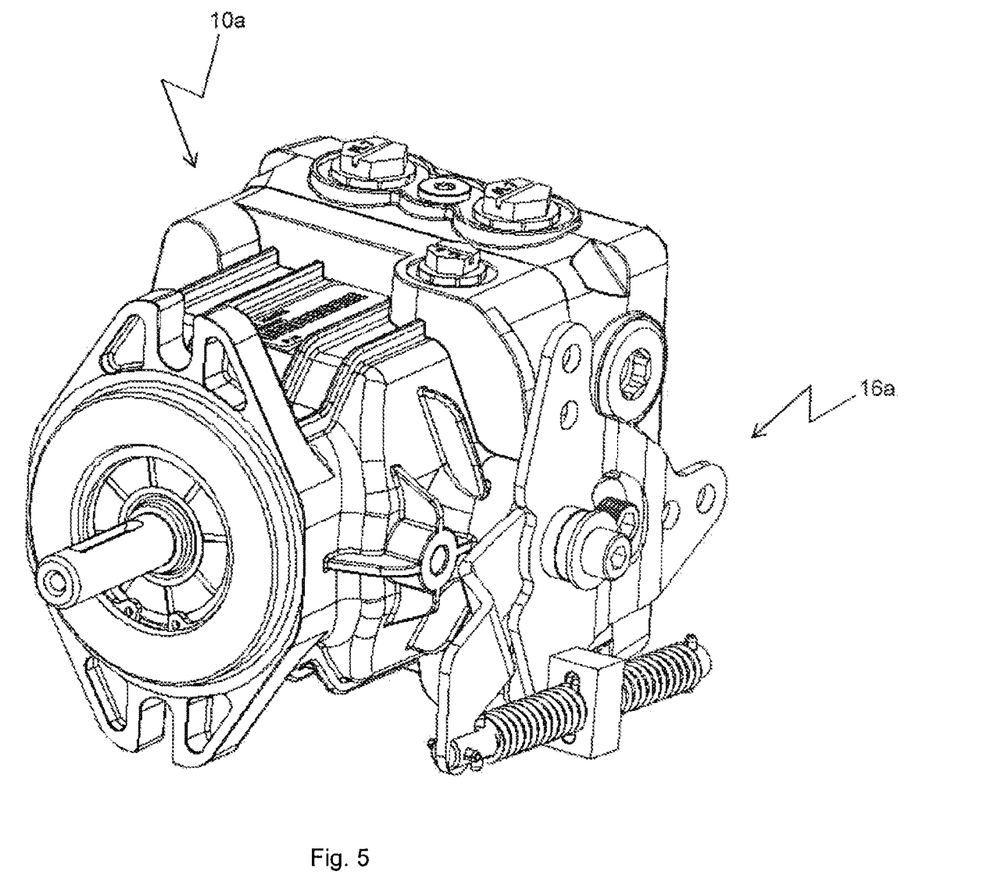
FIG. 5 is a perspective view a hydraulic apparatus having a return to neutral mechanism in accordance with a second embodiment of the present invention.
Figure 6:
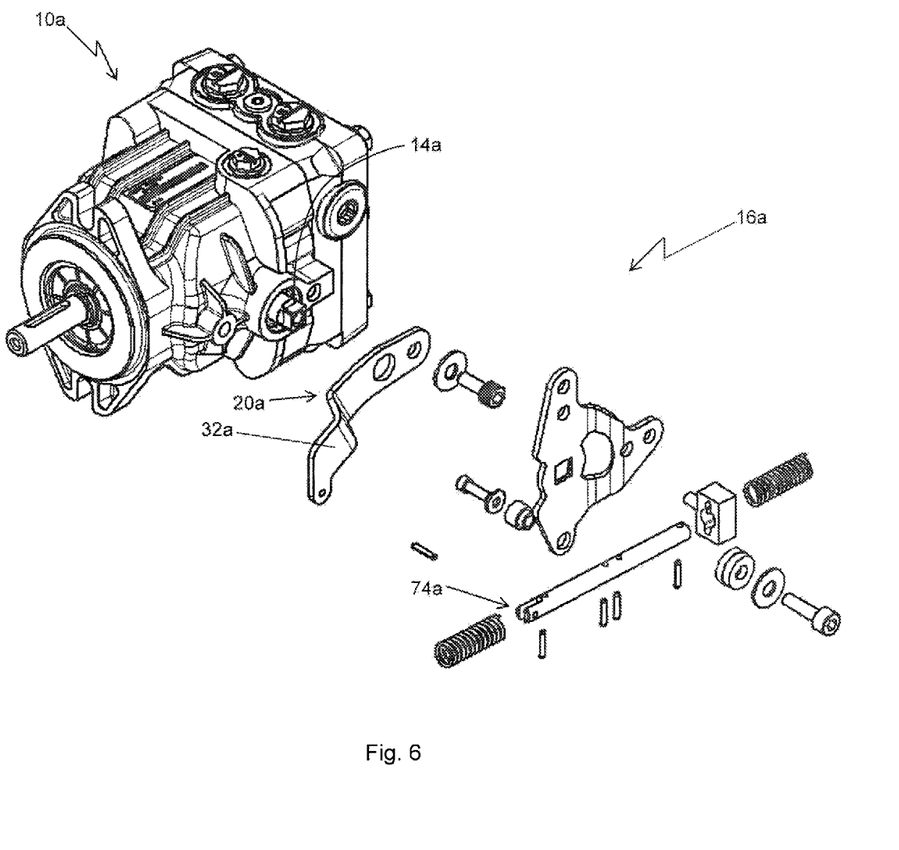
FIG. 6 is an exploded view of the return to neutral mechanism shown in FIG. 5 adjacent a perspective view of the hydraulic apparatus of FIG.5.

FIGS. 5 and 6 illustrate a second embodiment of the present invention. Components in FIGS. 5 and 6 that are the same as or similar to those previously described with reference to FIGS. 1-4 are indicated using the same reference numbers with the addition of the suffix "a". In the embodiment of FIGS. 5 and 6, the bent arm 32a of the stationary bracket 20a extends in a direction opposite that shown in FIGS. 1-4. As such, the slot 74a in the spring rod 66a is located on the second end 70a. Thus, in the embodiment of FIGS. 5 and 6, a counterclockwise rotation of the rotating bracket 40a moves the guide block 50a away from the bent arm 32a to compress spring 104a. A clockwise rotation of the rotating bracket 40a moves the guide block 50a toward the bent arm portion 32a to compress spring 106a.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:

1. A hydraulic apparatus comprising:
a housing;
a trunnion arm extending from the housing;
a first bracket rotationally coupled to the trunnion arm;
a second bracket fixed to the housing;
a rod member pivotally connected to the second bracket;
a glide member pivotally coupled to the first bracket and translatable along the rod member;
a first biasing member biasing the glide member to move the first bracket toward a neutral position when the first bracket is rotated in a first direction; and
a second biasing member biasing the glide member to move the first bracket toward the neutral position when the first bracket is rotated in a second direction.

2. The hydraulic apparatus of claim 1, wherein the first and second biasing members are compression springs.

3. The hydraulic apparatus of claim 2, wherein the first and second compression springs have the same spring constant.

4. The hydraulic apparatus of claim 2, wherein the first and second compression springs are coaxial with the rod.

5. The hydraulic apparatus of claim 1, wherein the glide member is positioned between the first and second biasing members.

6. The hydraulic apparatus of claim 1, wherein the first and second biasing members are compression springs each having a first end positioned in contact with the glide member and a second distal end, wherein each distal spring end is adjacent a pin positioned through the rod, the pin having a length equal to or greater than a diameter of the spring.

7. The hydraulic apparatus of claim 6, wherein the glide member has through hole slightly larger than the diameter of the rod, the through hole also having a cut out portion allowing the glide member to travel over a different pin while compressing one of the springs.

8. A hydraulic apparatus comprising:
a housing;
a trunnion arm extending from the housing;
a first bracket rotationally coupled to the trunnion arm; and
a return to neutral assembly comprising:
  a second bracket fixed to the housing;
  a rod member pivotally connected to the second bracket;
  a glide member pivotally coupled to the first bracket and translatable along the rod member; and
  at least one compression spring positioned on the rod member, the spring capable of biasing the glide member to move the bracket toward a neutral position when the bracket is rotated in a first direction.

9. The hydraulic apparatus of claim 8, wherein the return to neutral assembly further comprises a second compression spring positioned on the rod member, the second spring capable of biasing the glide member to move the bracket toward a neutral position when the bracket is rotated in a second direction.

10. The hydraulic apparatus of claim 9, wherein the first and second compression springs each having a first end positioned in contact with the glide member and a second distal end, wherein each distal spring end is adjacent a pin positioned through the rod, the pins having a length equal to or greater than a diameter of the spring.

11. The hydraulic apparatus of claim 10, wherein the glide member has a through hole slightly larger than the diameter of the rod, the through hole also having a slot portion allowing the glide member to travel over a different pin while compressing one of the springs.

12. The hydraulic apparatus of claim 9, wherein the first and second compression springs have the same spring constant.

13. The hydraulic apparatus of claim 9, wherein the first and second compression springs have different spring constants.

* * * * *